3,322,861
VINYL RESINS CONTAINING DIPHOSPHONIUM HALIDES AS FLAME-RETARDANTS

Helen Currier Gillham, Stamford, and Allan Ellis Sherr, Norwalk, Conn., assignors to American Cyanamid Company, Stamford, Conn., a corporation of Maine
No Drawing. Filed June 12, 1964, Ser. No. 374,841
13 Claims. (Cl. 260—893)

This application is a continuation-in-part of our co-pending application, Ser. No. 316,499, filed Oct. 16, 1963, now abandoned, which in turn, is a continuation-in-part of application Ser. No. 296,367, filed July 19, 1963, now abandoned.

This invention relates to flame-retardant compositions. More particularly, this invention relates to flame-retardant compositions comprising thermoplastic polymers containing a flame-retarding amount of a diphosphonium halide. More particularly, this invention relates to flame-retardant compositions comprising thermoplastic polymers containing a flame-retarding amount of a diphosphonium halide having the formula (I)

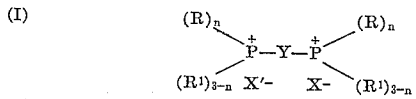

wherein R and $R^1$ individually represent an aryl radical ($C_6$–$C_{10}$), an alkyl radical ($C_1$–$C_8$), a cyano or hydroxy substituted alkyl radical ($C_1$–$C_8$) or an alkenyl radical ($C_2$–$C_8$), Y represents an alkylene radical ($C_2$–$C_{10}$), an arylene radical ($C_8$–$C_{16}$), an unsaturated alkylene radical ($C_2$–$C_{10}$) or an oxoalkylene radical ($C_3$–$C_{10}$), X and X' each represent a bromine, chlorine or iodine radical and $n$ is a whole positive integer of from 1 to 3, inclusive.

The use of various materials incorporated into thermoplastic resins in order to improve the flame-retardance thereof is known in the prior art. Many compounds are commercially available for such a use, among them being chlorostyrene copolymers, chlorinated paraffin wax with triphenyl stibine, chlorinated paraffins and aliphatic antimonyl compounds, as well as antimony oxide-chlorinated hydrocarbon mixtures. A drawback, however, of these compounds and mixtures of compounds has been the fact that generally a large amount, i.e. upwards of 35%, of the additive must be incorporated into the resin in order to make it sufficiently flame-retardant. Also these prior art additives tend to crystallize or oil out of the resin after a relatively short time of incorporation. We have now found a group of compounds which may be added to thermoplastic resins, in relatively small amounts, and still result in the production of satisfactory flame-retardant compositions which do not crystallize or oil out of the resin after incorporation therein.

The production of thermoplastic resin compositions which are flame-retardant, i.e. have high resistance to heat, is of considerable commercial importance. For example, such articles as castings, moldings, foamed or laminated structures and the like are required, or at least desired, to be resistant to fire and flame and to posses the ability to endure heat without deterioration. Typical illustrations of such applications can be found in castings for live electrical contacts which should not be ignited or deteriorated by heat and sparks. Structural members such as pipes, wall coverings, wall paneling, windows etc., and items such as ash trays, waste baskets, fibers and the like are further examples of products wherein flame-retardance is desirable.

It is therefore an object of the present invention to provide novel flame-retardant thermoplastic resin compositions.

It is a further object of the present invention to provide flame-retardant compositions comprising thermoplastic polymers and a flame-retardant amount of a diphosphonium halide, such as those represented by Formula I.

These and further objects will become more apparent to those skilled in the art upon reading the more detailed description set forth hereinbelow.

THE THERMOPLASTIC POLYMERS

The thermoplastic polymers into which the flame-retardant agents may be incorporated to produce the novel compositions of the present invention, are, generally, the vinyl type polymers wherein the monomeric material is polymerized, by any known method, via the vinyl unsaturation therein. Additionally, thermoset type materials such as the polyester resins, polyurethanes, and the like may be used. Examples of the vinyl type polymers which may be used to form our novel compositions are the polymers of the acrylates and methacrylates, the vinyl halides, the vinylidene halides, the vinyl acetates; polyvinyl butyral, butadiene copolymers, e.g. butadiene-styrene, acrylonitrile-butadiene-styrene polymers, the polyacrylonitriles, and the like. Additionally and preferably, one may incorporate the flame-retardant agents mentioned above into such polymers as the $\alpha$-olefin polymers, such as the homopolymers and copolymers etc. containing, as the major constituent, ethylene, propylene, and the like, the homopolymers and copolymers of various vinyl cyclic compounds, e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, etc., and the acrylate and methacrylate polymers produced from monomers having the formula (II)

wherein $R^2$ is a hydrogen or methyl radical and $R^3$ is a hydrogen or alkyl radical having from 1 to 6 carbon atoms, inclusive. Examples of monomers represented by Formula II include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate, and their corresponding alkyl methacrylates.

Additional examples of monomers which may be used to form the thermoplastic vinyl polymers encompassed by the present invention, polymerized either singularly or in combination with each other or with the other compounds set forth hereinabove, are such monomers as the unsaturated alcohol esters, more particularly the allyl, methallyl, vinyl, methvinyl, butenyl, etc., unsaturated esters of aliphatic and aromatic monobasic acids such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; unsaturated ethers, e.g., ethyl vinyl ether, diallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc. and ethylene.

Other examples of monomers that can be polymerized to form the resin portion of our novel flame-retardant compositions are the vinyl halides, more particularly, vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added, if need, in order to improve the compatibility and copolymerization characteristics of the mixed monomers.

More specific examples of allyl compounds that can be polymerized to useful polymers, useful in the production of our novel flame-retardant compositions, are allyl alcohol, methallyl alcohol, diallyl carbonate, allyl lactate, allyl alphahydroxyisobutyrate, allyl trichlorosilane, diallyl phthalate, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballyate, triallyl cyanurate, triallyl citrate, triallyl phosphate, tetrallyl silane, tetrallyl silicate, hexallyldisiloxane, allyl diglycol carbonate, etc. Other examples of allyl compounds that may be employed are given, for example, in U.S. Patent No. 2,510,503, issued June 6, 1950.

These above mentioned monomers may be polymerized, copolymerized, etc., in any known manner such as by free-radical generating catalysts, irradiation, anion and cation type catalysts and the like, said method of polymerization forming no part of the present invention.

THE DIPHOSPHONIUM HALIDES

As mentioned above, we have discovered that the addition of diphosphonium halides to a thermoplastic resin results in the production of resinous compositions having excellent flame-retardant properties. According to the present invention, any diphosphonium halide, stable to processing conditions, may be used for this purpose. A preferred group of diphosphonium halides, however, are those represented by Formula I. A further preferred group of diphosphonium halide compounds useful in producing our novel compositions are those wherein R and $R^1$ of Formula I are the same. The diphosphonium halides may be incorporated into the resins in flame-retardant amounts, i.e. generally amounts ranging from about 0.1%, by weight, to about 35%, by weight, preferably 0.5% to 25%, by weight, based on the weight of the polymer, have been found sufficient.

These diphosphonium halides are generally known in the art and can be incorporated into the resin by any known method. That is to say, the flame-retardant diphosphonium halide additive may be added to the resin by milling the resin and the halide on, for example, a two-roll mill, in a Banbury mixer etc., or the halide may be added by molding the halide and resin simultaneously, extruding the halide and resin or by merely blending the resin in powder form with the halide and thereafter forming the final desired article. Additionally, the diphosphonium halide may also be added during the resin manufacture, i.e., during the monomer polymerization procedure, provided the catalyst etc. and other ingredients of the polymerization system are inert to the diphosphonium halide.

The diphosphonium halides set forth hereinabove may be produced in any known manner without varying from the scope of the present invention. Various methods for the production of diphosphonium halides of this type are disclosed in, for example, articles by Grayson et al., J. Am. Chem. Soc., volume 81, page 4806, 1959; Grayson et al., J. Am. Chem. Soc., volume 82, page 3922, 1960; Grayson et al., patent application Ser. No. 774,157, filed Nov. 17, 1958 now abandoned and Grayson et al., patent application Ser. No. 188,542, filed Apr. 8, 1962 and now U.S. Patent No. 3,148,205, and these articles and applications are hereby incorporated herein by reference.

Generally, the procedure for the production of these phosphonium halides comprises reacting an excess of a compound of the formula

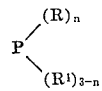

with a compound of the formula $$XYX'$$

wherein R, $R^1$, $n$, Y, X and X' are as defined above in regard to Formula I, under the following conditions: heat, to a temperature ranging from about 0° C. to about 150° C., a solution of the dihalide and tertiary phosphine in an appropriate solvent, such as butanol, acetonitrile and the like, for from 1 to 24 hours. The diphosphonium halide is isolated by filtration, in the case of an insoluble product, by precipitation with ethyl ether or by evaporation of the solvent. Yields usually are from 50% to 100% of the theoretical, said procedures, however, forming no part of the present invention.

In any procedure wherein an unsaturated radical is present in the phosphine or the dihalide, a polymerization inhibitor such as hydroquinone is preferably added during the diphosphonium halide production to retard the polymerization of the compound produced.

Examples of compounds which are represented by Formula I and are therefore useful in producing the novel compositions of the present invention include:

ethylenebis[triphenylphosphonium bromide],
ethylenebis[triphenylphosphonium chloride],
ethylenebis[triphenylphosphonium iodide],
butylenebis[triphenylphosphonium chloride],
butylenebis[triphenylphosphonium bromide],
butylenebis[triphenylphosphonium iodide],
octylenebis[triphenylphosphonium bromide],
octylenebis[triphenylphosphonium chloride],
octylenebis[triphenylphosphonium iodide],
decylenebis[tris-(2,3,5-trimethylphenyl)-phosphonium chloride],
decylenebis[tris-(2,3,5-trimethylphenyl)-phosphonium bromide],
decylenebis[tris-(2,3,5-trimethylphenyl)-phosphonium iodide],
propylenebis[trinaphthylphosphonium chloride],
propylenebis[trinaphthylphosphonium bromide],
propylenebis[trinaphthylphosphonium iodide],
ethylenebis(trimethylphosphonium chloride),
ethylenebis(trimethylphosphonium bromide),
ethylenebis(trimethylphosphonium iodide),
(p-phenylenedimethylene)bis[tributylphosphonium chloride],
(p-phenylenedimethylene)bis[tributylphosphonium bromide],
(p-phenylenedimethylene)bis[tributylphosphonium iodide],
(p-phenylenediethylene)bis[triheptylphosphonium chloride],
(p-phenylenediethylene)bis[triheptylphosphonium bromide],
(p-phenylenediethylene)bis[triheptylphosphonium iodide],
(p-phenylenedibutylene)bis[trioctylphosphonium chloride],
(p-phenylenedibutylene)bis[trioctylphosphonium bromide],
(p-phenylenedibutylene)bis[trioctylphosphonium iodide],
(p-phenylenedipentylene)bis[tripropylphosphonium chloride], (p-phenylenedipentylene)bis[tripropylphosphonium bromide],
(p-phenylenedipentylene)bis[tripropylphosphonium iodide],
ethylenylenebis[tris(cyanomethyl)phosphonium chloride],
ethylenylenebis[tris(cyanomethyl)phosphonium bromide],
ethylenylenebis[tris(cyanomethyl)phosphonium iodide],
2-butenylenebis[tris(2-hydroxyethyl)phosphonium chloride],
2-butenylenebis[tris(2-hydroxyethyl)phosphonium bromide],
2-butenylenebis[tris(2-hydroxyethyl)phosphonium iodide],
3-heptenylenebis[tris(3-cyanobutyl)phosphonium chloride],
3-heptenylenebis[tris(3-cyanobutyl)phosphonium bromide],
3-heptenylenebis[tris(3-cyanobutyl)phosphonium iodide],
5-decenylenebis[tris(2-hydroxypentyl)phosphonium chloride],
5-decenylenebis[tris(2-hydroxypentyl)phosphonium bromide],
5-decenylenebis[tris(2-hydroxypentyl)phosphonium iodide],
(2-oxotrimethylene)bis[tris(6-cyanohexyl)phosphonium chloride],
(2-oxotrimethylene)bis[tris(6-cyanohexyl)phosphonium bromide],
(2-oxotrimethylene)bis[tris(6-cyanohexyl)phosphonium iodide],
(3-oxopentamethylene)bis[tris(8-hydroxyoctyl)phosphonium chloride],
(3-oxopentamethylene)bis[tris(8-hydroxyoctyl)phosphonium bromide],
(3-oxopentamethylene)bis[tris(8-hydroxyoctyl)phosphonium iodide],
(4-oxononamethylene)bis[trivinylphosphonium chloride],
(4-oxononamethylene)bis[trivinylphosphonium bromide],
(4-oxononamethylene)bis[trivinylphosphonium iodide],
(3-oxodecamethylene)bis[triallylphosphonium chloride],
(3-oxodecamethylene)bis[triallylphosphonium bromide],
(3-oxodecamethylene)bis[triallylphosphonium iodide],
ethylenebis[tris(2-butylene)phosphonium chloride],
ethylenebis[tris(2-butylene)phosphonium bromide],
ethylenebis[tris(2-butylene)phosphonium iodide],
propylenebis[tris(3-octylene)phosphonium chloride],
propylenebis[tris(3-octylene)phosphonium bromide],
propylenebis[tris(3-octylene)phosphonium iodide],
ethylenebis[diphenylpropylphosphonium chloride],
ethylenebis[diphenylpropylphosphonium bromide],
ethylenebis[diphenylpropylphosphonium iodide],
(p-phenylenedimethylene)bis[dimethyloctylphosphonium chloride],
(p-phenylenedimethylene)bis[dimethyloctylphosphonium bromide],
(p-phenylenedimethylene)bis[dimethyloctylphosphonium iodide],
2-butenylenebis[bis(2-cyanoethyl)butylphosphonium chloride],
2-butenylenebis[bis(2-cyanoethyl)butylphosphonium bromide],
2-butenylenebis[bis(2-cyanoethyl)butylphosphonium iodide],
(2-oxotrimethylene)bis[bis(3-hydroxyhexyl)naphthylphosphonium chloride],
(2-oxotrimethylene)bis[bis(3-hydroxyhexyl)naphthylphosphonium bromide],
(2-oxotrimethylene)bis[bis(3-hydroxyhexyl)naphthylphosphonium iodide],
(2-butylene)bis[diallyl-(2-cyanooctyl)phosphonium chloride],
(2-butylene)bis[diallyl-(2-cyanooctyl)phosphonium bromide],
(2-butylene)bis[diallyl-(-cyanooctyl)phosphonium iodide],
(4-octylene)bis[divinylphenylphosphonium chloride],
(4-octylene)bis[divinylphenylphosphonium bromide],
(4-octylene)bis[divinylphenylphosphonium iodide],
(2-oxotrimethylene)bis(trimethylphosphonium) chloride bromide, ethylenebis(triphenylphosphonium) bromide iodide,
(p-phenylenedimethylene)bis[tris(2-cyanoethyl)phosphonium]chloride iodide,
ethylenebis[tris(2-cyanoethyl)phosphonium chloride],
ethylenebis[tris(2-cyanoethyl)phosphonium bromide],
ethylenebis[tris(2-cyanoethyl)phosphonium iodide],
ethylenebis[tris(2-hydroxyethyl)phosphonium chloride],
ethylenebis[tris(2-hydroxyethyl)phosphonium bromide],
ethylenebis[tris(2-hydroxyethyl)phosphonium iodide],
propylenebis[tris(2-cyanoethyl)phosphonium chloride],
propylenebis[tris(2-cyanoethyl)phosphonium bromide],
propylenebis[tris(2-cyanoethyl)phosphonium iodide],
butylenebis[tris(2-cyanoethyl)phosphonium chloride],
butylenebis[tris(2-cyanoethyl)phosphonium bromide],
butylenebis[tris(2-cyanoethyl)phosphonium iodide],
decylenebis[tris(2-cyanoethyl)phosphonium chloride],
decylenebis[tris(2-cyanoethyl)phosphonium bromide],
decylene[tris(2-cyanoethyl)phosphonium iodide],
(p-phenylenedimethylene)bis[tris(2-cyanoethyl)phosphonium chloride],
(p-phenylenedimethylene)bis[tris(2-cyanoethyl)phosphonium bromide],
(p-phenylenedimethylene)bis[tris(2-cyanoethyl)phosphonium iodide],
ethylenebis[tributylphosphonium chloride],
ethylenebis[tributylphosphonium bromide],
ethylenebis[tributylphosphonium iodide],
2-butenylenebis[tris(2-cyanoethyl)phosphonium chloride],
2-butenylenebis[tris(2-cyanoethyl)phosphonium bromide],
2-butenylenebis[tris(2-cyanoethyl)phosphonium iodide],
2-oxotrimethylenebis[triphenylphosphonium chloride],
2-oxotrimethylenebis[triphenylphosphonium bromide],
2-oxotrimethylenebis[triphenylphosphonium iodide],
and the like.

It is within the scope of the present invention to incorporate such ingredients as plasticizers, dyes, pigments, stabilizers, antioxidants, antistatic agents and the like to our novel compositions without detracting from the advantageous properties thereof.

The following examples are set forth for purposes of illustration only and are not to be construed as limitations on the present invention as set forth in the appended claims. All parts and percentages are by weight unless otherwise specified.

Any appropriate flame retardance test may be used to determine the flame retardance properties of any specific compound. One test which is reasonably efficient is that designated as a modified version of ASTM test D–635–

56T. The specifications for this test are: A specimen, 5" in length, 0.5" in width and 0.045" in thickness, is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4" mark, the specimen is designated as "self-extinguishing" or "flame-retardant."

*Example 1*

Eighty parts of polyethylene and 20 parts of ethylenebis[tris(2-cyanoethyl)phosphonium bromide] are milled together on a two roll mill at about 170° C. The resulting milled composition is molded into strips 5" in length, 0.5" in width and 0.045" in thickness and said strips are then subjected to an art recognized flame-retardance test. The strips pass the test and are therefore designated as flame-retardant.

Following the procedure of Example 1, the following examples were carried out utilizing different flame-retardant agents and various thermoplastic resin polymers. The results of these examples are set forth in Table I below. In each instance the resultant plastic-diphosphonium halide mixture passed the flame-retardance test and was designated as flame and fire retardant. In the table PE=polyethylene; PP=polypropylene; PMMA=poly(methylmethacrylate); PA=poly(acrylic acid); AN=acrylonitrile; ST=styrene; BD=butadiene; PS=polystyrene; PMS=poly(p-methylstyrene); PVP=poly(vinylpyridine) and PAMS=poly(α-methylstyrene).

TABLE I

| Ex. | Polymer | Flame Retardant | | | | | | Percent |
|---|---|---|---|---|---|---|---|---|
| | | R | R¹ | Y | $n$ | X | X' | |
| 2 | PMMA | $NCCH_2CH_2$ | $NCCH_2CH_2$ | $CH_2CH_2$ | 2 | Br | Br | 10 |
| 3 | PE | $NCCH_2CH_2$ | $NCCH_2CH_2$ | $CH_2CH_2$ | 2 | Cl | Cl | 30 |
| 4 | PE | $NCCH_2CH_2$ | $NCCH_2CH_2$ | $CH_2CH_2CH_2$ | 2 | Br | Br | 30 |
| 5 | PP | $NCCH_2CH_2$ | $NCCH_2CH_2$ | $CH_2CH_2CH_2$ | 2 | Br | Br | 30 |
| 6 | PE | $NCCH_2CH_2$ | $NCCH_2CH_2$ | $CH_2CH_2CH_2CH_2$ | 2 | Br | Br | 25 |
| 7 | PP | $NCCH_2CH_2$ | $NCCH_2CH_2$ | $CH_2CH_2CH_2CH_2$ | 2 | Br | Br | 25 |
| 8 | PE | $NCCH_2CH_2$ | $NCCH_2CH_2$ | $(CH_2)_{10}$ | 2 | Br | Br | 15 |
| 9 | PMMA | $NCCH_2CH_2$ | $NCCH_2CH_2$ | $(CH_2)_{10}$ | 2 | Br | Br | 20 |
| 10 | PE | $NCCH_2CH_2$ | $NCCH_2CH_2$ | $CH_2{-}C_6H_4{-}CH_2$ | 2 | Cl | Cl | 25 |
| 11 | PE | $C_6H_5$ | $C_6H_5$ | $CH_2CH_2$ | 2 | Br | Br | 20 |
| 12 | PP | $C_6H_5$ | $C_6H_5$ | $CH_2CH_2$ | 2 | Br | Br | 20 |
| 13 | PE | $C_6H_5$ | $C_6H_5$ | $CH_2CH_2$ | 2 | I | I | 20 |
| 14 | PE | $C_6H_5$ | $C_6H_5$ | $CH_2CH_2$ | 2 | Cl | Cl | 30 |
| 15 | PE | $C_6H_5$ | $C_6H_5$ | $(CH_2)_3$ | 2 | Br | Br | 15 |
| 16 | PE | $C_6H_5$ | $C_6H_5$ | $(CH_2)_4$ | 2 | Br | Br | 20 |
| 17 | PE | $C_6H_5$ | $C_6H_5$ | $(CH_2)_{10}$ | 2 | Br | Br | 20 |
| 18 | PP | $C_6H_5$ | $C_6H_5$ | $(CH_2)_{10}$ | 2 | Br | Br | 20 |
| 19 | PE | $C_6H_5$ | $C_6H_5$ | $CH_2{-}C_6H_4{-}CH_2$ | 2 | Br | Br | 15 |
| 20 | PP | $C_6H_5$ | $C_6H_5$ | $CH_2{-}C_6H_4{-}CH_2$ | 2 | Br | Br | 15 |
| 21 | PE | $CH_3CH_2CH_2CH_2$ | $CH_3CH_2CH_2CH_2$ | $CH_2CH_2$ | 2 | Br | Br | 20 |
| 22 | PE | $CH_3CH_2CH_2CH_2$ | $CH_3CH_2CH_2CH_2$ | $CH_2CH_2$ | 2 | Cl | Cl | 30 |
| 23 | PE | $NCCH_2CH_2$ | $NCCH_2CH_2$ | $CH_2CH{=}CHCH_2$ | 2 | Cl | Cl | 25 |
| 24 | PE | $C_6H_5$ | $C_6H_5$ | $CH_2\underset{O}{\overset{\parallel}{C}}CH_2$ | 2 | Cl | Cl | 20 |
| 25 | Mixture of BD-AN (10-75%) and AN, ST (25-90%).[1] | $NCCH_2CH_2$ | $NCCH_2CH_2$ | $CH_2CH_2$ | 2 | Br | Br | 20 |

TABLE I—Continued

| Ex. | Polymer | Flame Retardant | | | | | | Percent |
|---|---|---|---|---|---|---|---|---|
| | | R | R¹ | Y | $n$ | X | X' | |
| 26 | PE | naphthyl | naphthyl | CH=CH—CH₂ | 2 | I | I | 25 |
| 27 | PA | CH₃ | CH₃ | CH₂—CH₂—C₆H₄—CH₂CH₂ | 2 | Br | Br | 30 |
| 28 | PP | C₈H₁₇ | C₈H₁₇ | (CH₂)₅—C₆H₄—(CH₂)₅ | 2 | I | I | 25 |
| 29 | PE | CH₃—C₆H₅ | CH₃—C₆H₅ | CH₂CH₂ | 2 | I | I | 25 |
| 30 | PMMA | NC—CH₂—CH₂—CH₂ | C₆H₅ | CH=CH | 1 | I | I | 20 |
| 31 | PE | HOCH₂(CH₂)₇ | HOCH₂(CH₂)₇ | (CH₂)₄CH=CHCH₂ | 2 | Br | Br | 25 |
| 32 | PE | NCCH₂(CH₂)₆ | CH₃ | (CH₂)₄CH=CH(CH₂)₄ | 1 | I | I | 25 |
| 33 | MMA/AN/ST, 79/19/10 | CH₂=CHCH₂ | CH₂=CHCH₂ | CH₂CH₂ | 2 | Br | Br | 20 |
| 34 | PE | CH₂CH=CH(CH₂)₄ | C₂H₅ | CH₂CH₂CH₂ | 1 | I | I | 25 |
| 35 | PE | CH₂=CH | CH₂=CH | (CH₂)₂—C(O)—(CH₂)₂ | 2 | Br | I | 30 |
| 36 | PP | (CH₂)₂CH=CH(CH₂)₂ | C₆H₄(CH₃) | CH₂—C₆H₄—CH₂ | 1 | Cl | I | 30 |
| 37 | PMMA | CH₃—C₆H₄—CH₃ | C₃H₇ | (CH₂)₄—C(O)—(CH₂)₅ | 1 | I | Br | 30 |
| 38 | PE | CH₃CH₂CH—CH₂ (CH₃) | CH₃CH(OH)—CH₂ | (CH₂)₅ | 1 | Br | Cl | 30 |
| 39 | PE | CH₃CH=CH(CH₂)₃ | NCCH₂CH₂CH₂ | CH₂—C₆H₄—CH₂ | 1 | Br | I | 30 |
| 40 | PE | C₆H₁₁ | C₆H₁₁ | CH₂CH₂ | 2 | Br | Br | 20 |
| 41 | PS | NCCH₂CH₂ | NCCH₂CH₂ | CH₂CH₂ | 2 | Br | Br | 0.5 |
| 42 | PMS | C₆H₅ | C₆H₅ | CH₂CH₂ | 2 | Br | Br | 10 |
| 43 | PVP | CH₃—C₆H₅ | CH₃—C₆H₅ | (CH₂)₄ | 2 | Cl | Cl | 25 |
| 44 | PAMS | NCCH₂CH₂ | NCCH₂CH₂ | CH₂—C₆H₄—CH₂ | 2 | Br | Br | 25 |
| 45 | ST/BD, 95/5 | NCCH₂CH₂ | NCCH₂CH₂ | CH₂CH₂ | 1 | Br | Br | 2.0 |

[1] U.S. Patent No. 2,439,202.

We claim:

1. A flame-retardant composition comprising a thermoplastic polymer of an ethylerically unsaturated monomer and a flame-retarding amount of diphosphonium halide having the formula

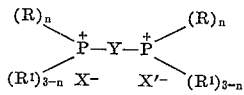

wherein R and R¹ are individually selected from the group consisting of aryl ($C_6$–$C_{10}$), alkyl ($C_1$–$C_8$), cyano and hydroxy substituted alkyl ($C_1$–$C_8$) and alkenyl radicals, Y is selected from the group consisting of saturated alkylene ($C_2$–$C_8$), arylene ($C_8$–$C_{16}$), unsaturated alkylene ($C_2$–$C_{10}$), and oxoalkylene ($C_3$–$C_{10}$) radicals, $n$ is a whole positive integer of from 1 to 3, inclusive, and X and X' are individually selected from the group consisting of a bromine, chlorine and iodine radical.

2. A flame-retardant composition according to claim 1 wherein the thermoplastic polymer is a polymer of an α-olefin.

3. A flame-retardant composition according to claim 1 wherein the thermoplastic polymer is a polymer of a compound having the formula

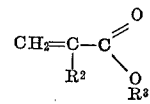

wherein R² is selected from the group consisting of hydrogen and a methyl radical and R³ is selected from the group consisting of hydrogen and an alkyl radical having from 1 to 6 carbon atoms, inclusive.

4. A flame-retardant composition according to claim 1 wherein the thermoplastic polymer is poly(methylmethacrylate).

5. A flame-retardant composition according to claim 1 wherein the thermoplastic polymer is a mixture of (A) a butadiene-acrylonitrile copolymer and (B) an acrylonitrile-styrene copolymer, the amount of A and B ranging from about 10–75% to 90–25%, respectively.

6. A flame-retardant composition according to claim 1 wherein the thermoplastic polymer is a polymer of a vinyl cyclic compound.

7. A flame-retardant composition according to claim 1 wherein the thermoplastic polymer is a polymer of styrene.

8. A flame-retardant composition comprising polystyrene and a flame-retarding amount of ethylenebis[tris(2-cyanoethyl)phosphonium bromide].

9. A flame-retardant composition comprising polyethylene and a flame-retarding amount of ethylenebis[tris(2-cyanoethyl)phosphonium bromide].

10. A flame-retardant composition comprising polyethylene and a flame-retarding amount of ethylenebis[triphenylphosphonium bromide].

11. A flame-retardant composition comprising polyethylene and a flame-retarding amount of decamethylenebis[tris(2-cyanoethyl)phosphonium bromide].

12. A flame-retardant composition comprising polyethylene and a flame-retarding amount of phenylenedimethylenebis[triphenylphosphonium bromide].

13. A flame-retardant composition comprising polyethylene and a flame-retarding amount of trimethylenebis[triphenylphosphonium bromide].

References Cited
UNITED STATES PATENTS 2,814,573 11/1957 Reeves et al. _____ 260—893
3,054,698 9/1962 Wagner _____ 260—893

MURRAY TILLMAN, *Primary Examiner.*

G. F. LESMES, *Assistant Examiner.*